United States Patent

Noda et al.

[11] Patent Number: 5,909,418
[45] Date of Patent: *Jun. 1, 1999

[54] OPTICAL INFORMATION RECORDING DEVICE AND METHOD FOR DETECTING AND VERIFYING RECORDED INFORMATION

[75] Inventors: Kazuo Noda, Yokohama; Koichi Yamazaki, Sakado, both of Japan

[73] Assignee: Nippon Conlux Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,590

[22] Filed: Aug. 15, 1995

[30] Foreign Application Priority Data

Aug. 26, 1994 [JP] Japan .................................... 6-225594

[51] Int. Cl.$^6$ ........................................................ G11B 7/00
[52] U.S. Cl. ......................... 369/54; 369/44.37; 369/112; 369/44.41
[58] Field of Search ............................. 369/44.37, 44.38, 369/44.26, 109, 44.12, 112, 103, 54, 44.41

[56] References Cited

U.S. PATENT DOCUMENTS 4,630,252  12/1986  Miura et al. .......................... 369/44.25
5,144,610   9/1992  Horiguchi .
5,267,226  11/1993  Matsuoka et al. .................... 369/44.37

FOREIGN PATENT DOCUMENTS 0 077 642    4/1983   European Pat. Off. .
0 147 006    7/1985   European Pat. Off. .
0 336 328   10/1989   European Pat. Off. .
0 589 670    3/1994   European Pat. Off. .
0 698 880    2/1996   European Pat. Off. .
55-122216    9/1995   Japan .

*Primary Examiner*—Thang V. Tran
*Attorney, Agent, or Firm*—Graham & James LLP

[57] ABSTRACT

A laser light beam generated from a light source is divided by a diffraction grating into a plurality of light beams, i.e., a single main beam to be used for recording information and plural auxiliary beams distributed on two imaginary straight lines crossing each other. One of the straight lines extends parallel to tracks of a recording medium. The resultant divided beams are converged to be irradiated onto a recording medium, and reflected components, from the recording medium, of the beams are received by corresponding light receiving elements. Thus, the main and auxiliary beams distributed on one of the two imaginary straight lines are used to perform focusing and tracking. Further, one of the two auxiliary beams distributed on the other straight line are used to determine whether a track where information is to be recorded is a blank area or not, and the other of the auxiliary beams is used to verify whether the information has been recorded correctly.

10 Claims, 3 Drawing Sheets

OPTICAL INFORMATION RECORDING DEVICE AND METHOD FOR DETECTING AND VERIFYING RECORDED INFORMATION

BACKGROUND OF THE INVENTION

The present invention relates to a method and device which are applied to an apparatus where an optical head and a recording medium reciprocate relative to each other to record and reproduce desired information onto and from the medium, for determining whether or not a specific portion of the medium where information is to be recorded is a blank area having no information recorded thereon (i.e., whether or not the specific portion is available for recording information), and also relates to a method and device for verifying whether or not information recording has been performed correctly on a specific portion of a recording medium (i.e., the propriey of the recorded information).

To newly record information onto a write-once type optical information recording medium such as an optical card, a specific portion (track) of the medium where the information is to be recorded (i.e., a track to be used for recording information) must of course be a blank area having no information recorded thereon, and thus it is necessary to determine in advance whether the track is a blank area or not. Such a determination as to whether the track to be used for recording is a blank area or not has conventionally been performed in the art by reading out predetermined information registered in a directory area.

Further, after information has been recorded on the recording medium, it is necessary to ascertain or verify whether the information recording has been performed correctly. To this end, it has been customary, as typically disclosed in Japanese Patent Laid-open Publication No. 55-122216, to perform information recording only during the forward travel, in a relative reciprocating movement, of the recording medium and then perform information reproduction only during the backward travel of the recording medium so as to verify the propriety or correctness of the newly recorded information.

However, the first-mentioned approach of determining whether a portion of the recording medium where information is to be recorded is a blank area or not by reading out information registered in the directory area is not satisfactory in that it involves an extra readout determination operation associated with the readout of the registered information, thus requiring a considerably long time in determining the availability of that portion.

The second-mentioned approach of verifying the propriety of the newly recorded information during the backward travel of the recording medium is also disadvantageous in that it provides poor recording efficiency and is time consuming, because information recording is permitted only during the forward travel. Further, because the verification of the recorded information is performed by reproducing the recorded information in the direction opposite to the information recording direction, an extra circuit is required for reversing the time series of the reproduced information or information to be recorded.

SUMMARY OF THE INVENTION

It is therefore an object of the present invention to provide an optical information recording device and method which permit a simple and prompt determination as to whether a specific portion of a recording medium to be used for recording information is a blank area or not with no need to read out predetermined information registered in a directory area.

It is another object of the present invention to provide an optical information recording device and method which permit information recording and subsequent verification of the recorded information during either forward travel or backward travel, in a relative reciprocating movement, of a recording medium to thereby achieve highly enhanced recording efficiency and substantially shortened recording time, and which also eliminate a need to reverse the time series of reproduced information or information to be recorded.

An optical information recording device in accordance with a first aspect of the present invention comprises a section for irradiating a recording light beam onto a track where information is to be recorded, a section for irradiating a reproducing light beam onto the track before the recording light beam, and a section for, on the basis of a reproduction signal resulting from irradiation onto the track of the reproducing light beam, determining whether the track is a blank area having no information recorded thereon.

In the optical information recording device thus arranged, when the recording light beam accesses a track for recording information, the reproducing light beam is irradiated onto the same track prior to irradiation of the recording light beam, and whether or not the track is a blank area is determined on the basis of a reproduction signal resulting from the reproducing light beam irradiation. With this feature, it is allowed to promptly determine in real time whether the track is a blank area with no need to read out track information registered in a directory area.

An optical information recording device in accordance with a second aspect of the present invention comprises a section for irradiating a recording light beam onto a track where information is to be recorded, a section for irradiating a reproducing light beam onto the track after the recording light beam, and a section for, on the basis of a reproduction signal resulting from irradiation onto the track of the reproducing light beam, verifying propriety of information recorded on the track by use of the recording light beam.

In the optical information recording device thus arranged, when the recording light beam accesses a track for recording information, the reproducing light beam is irradiated onto the same track after irradiation of the recording light beam, and the propriety or correctness of the information recorded on the track by use of the recording light beam is verified on the basis of the reproduction signal resulting from the reproducing light beam irradiation. Accordingly, while recording information onto the track, it is allowed to immediately verify whether the contents of the information having just been recorded is correct or not, and thus it is not necessary for the optical head to make a reciprocating (forward/backward) movement relative to the same track for the purposes of recording and reproduction (verification). Namely, in a single reciprocating movement of the optical head relative to a recording medium, recording and reproduction (verification) for one track can be performed during the forward travel, and recording and reproduction (verification) for another track can be performed during the backward travel. This achieves highly enhanced recording efficiency and can substantially shorten the total time necessary for recording. In addition, because the reproduction operation for verifying the recorded information is done in the forward direction, there is no need to provide a special circuit etc. for reversing the time series of reproduced information or information to be recorded.

The features of the devices according to the first and second aspects may be combined for combined advantageous results. That is, an optical information recording device in accordance with a third aspect of the present invention may comprise a section for irradiating a recording light beam onto a track where information is to be recorded, a section for irradiating a first reproducing light beam onto the track before the recording light beam, a section for, on the basis of a reproduction signal resulting from irradiation onto the track of the first reproducing light beam, determining whether the track is a blank area having no information recorded thereon, a section for irradiating a second reproducing light beam onto the track after the recording light beam, and a section for, on the basis of a reproduction signal resulting from irradiation onto the track of the second reproducing light beam, verifying propriety of information recorded on the track by use of the recording light beam.

Further, an optical information recording method in accordance with the present invention comprises the steps of irradiating a recording light beam onto a track where information is to be recorded, irradiating a reproducing light beam onto the track before the recording light beam, then determining, on the basis of a reproduction signal resulting from irradiation onto the track of the reproducing light beam, whether the track is a blank area having no information recorded thereon, and then recording the information onto the track by use of the recording light beam when it is determined that the track is a blank area, but causing the recording light beam to access another track when it is determined in the step of determining that the track is not a blank area.

An optical information recording method in accordance with another aspect of the present invention comprises the steps of irradiating a recording light beam onto a track where information is to be recorded, irradiating a reproducing light beam onto the track after the recording light beam, then verifying, on the basis of a reproduction signal resulting from irradiation onto the track of the reproducing light beam, the propriety of information recorded on the track by use of the recording light beam, and re-recording the information when it is determined in the step of determining that the information recorded on the track is improper.

In one embodiment of the present invention, a laser light beam generated from a light source is divided by a diffraction grating structure into a plurality of light beams, i.e., a single main beam to be used for recording information and plural auxiliary beams distributed on two imaginary straight lines crossing each other. The resultant divided beams are irradiated onto a recording medium, and respective reflected components, from the recording medium, of the beams are received by corresponding light receiving elements. Thus, the main and auxiliary beams distributed on one of the two imaginary straight lines are used to perform focusing and tracking. On the other hand, of the light beams distributed on the other of the two imaginary straight lines, the auxiliary beam preceding the main beam in the direction of their relative movement to the recording medium are used to determine whether a track where information is to be recorded is a blank area or not, and the auxiliary beam succeeding the main beam is used to verify whether the information has been recorded correctly.

In one preferred embodiment, the laser light beam generated from the light source is divided by the diffraction grating structure into a single main beam and four auxiliary beams which are distributed on two straight lines crossing each other, with two auxiliary beams on each of the lines. These beams are converged and irradiated onto the recording medium, and reflected components, from the recording medium, of the main and auxiliary beams are received by plural (say, eight) light receiving elements. The main beam converged and irradiated onto the recording medium is used to record information and perform focusing based on the conventional astigmatism technique, and the two auxiliary beams distributed on one of the imaginary straight lines are used to perform tracking based on the conventional three-beam technique. The two auxiliary beams distributed on the other imaginary straight line are irradiated onto an information recording track with a predetermined interval or space, so that one of the two auxiliary beams preceding the main beam in the direction of the beams' relative movement to the recording medium are used to determine whether a track where information is to be recorded is a blank area or not, and the other auxiliary beam succeeding the main beam is used to verify whether the information has been recorded on the track correctly.

For better understanding of the above and other features, the preferred embodiments of the present invention will be described in detail below with reference to the accompanying drawings.

DETAILED DESCRIPTION OF THE PREFERRED EMBODIMENTS

Figure 1:
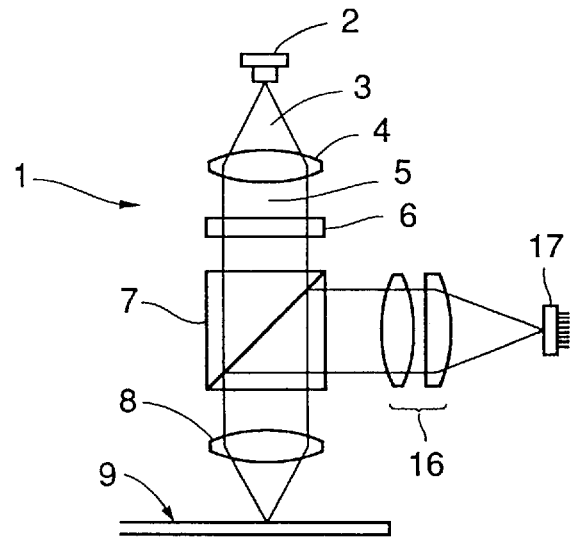
FIG. 1 is a schematic side view showing an example structure of an optical head used in an embodiment of an optical information recording device according to the present invention.

FIG. 1 shows an example structure of an optical head 1 for use in an optical information recording device and method in accordance with the present invention. In this example, the conventional astigmatism technique is employed for focusing, and the conventional three-beam technique is employed for tracking. In FIG. 1, a divergent laser light beam 3 generated from a semiconductor laser 2 is converted through a collimating lens 4 into a collimated light beam 5 and then divided through a diffraction grating structure 6 into a plurality of light beams. The plural light beams pass through a beam splitter 7 and converged through an objective lens 9 to be irradiated onto a recording medium 9. The recording medium 9 is, for example, an optical card.

Figure 2:
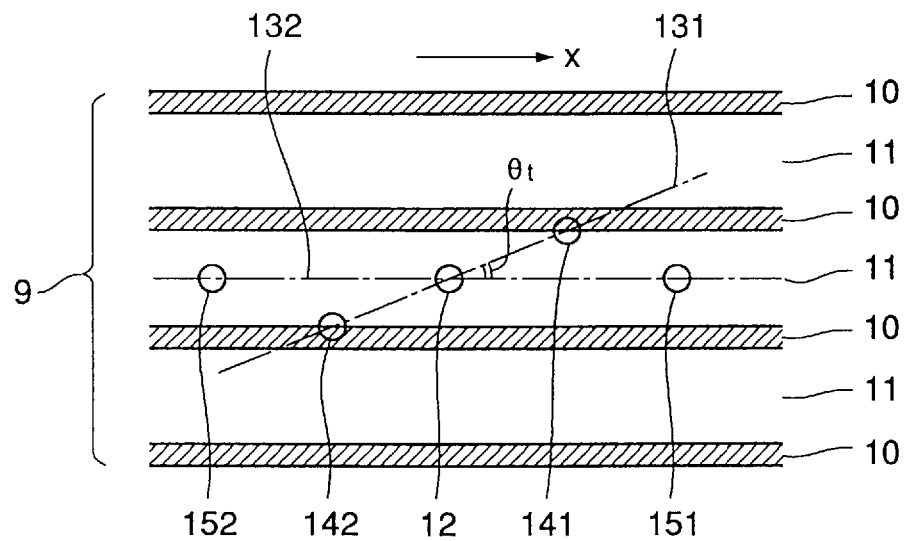
FIG. 2 is a plan view showing, in connection with a case where the three-beam technique is employed for tracking, an example arrangement of plural converged light beams irradiated from the optical head of FIG. 1 onto a recording medium.

As best seen in FIG. 2, the recording area of the medium 9 is composed of guide tracks 10 for guiding the light beams in such a manner that the beams are irradiated onto a same track at a time, and information recording tracks 11 each disposed between the guide tracks 10. Normally, information is recorded in the form of "pits" along the center of the recording track 11.

As typically shown in FIG. 2, in the embodiment of the present invention, the plural light beams irradiated from the optical head 1 onto the recording medium 9 include a converged main beam 12, a first set of two converged auxiliary beams 141 and 142 distributed on one of two imaginary straight lines 131 and 132 crossing each other at a point of the main beam 12, and a second set of two converged auxiliary beams 151 and 152 distributed on the other imaginary straight line 132. In this example, the imaginary straight line 132 extends parallel to the information recording tracks 11, while the imaginary straight line 131 is inclined with respect to the line 132 at a predetermined skew angle θt.

Figures 3A, 3B, 3C:
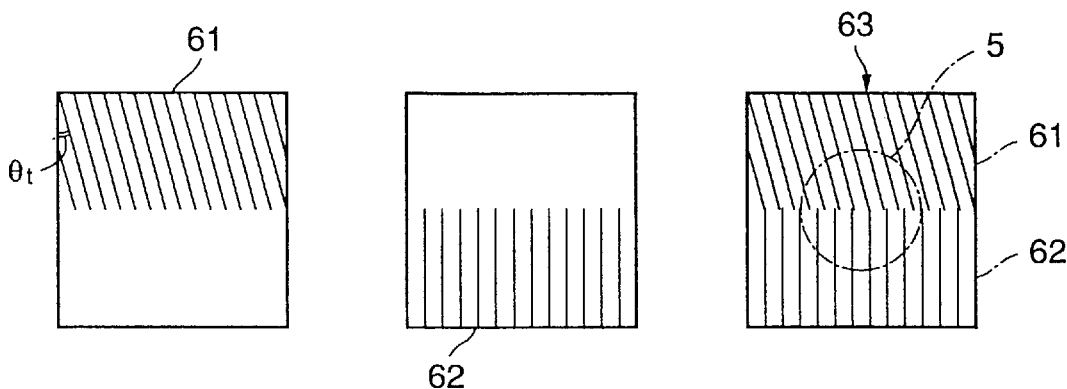
FIGS. 3a to 3c are plan views showing an example of a diffraction grating structure used in the optical head of FIG. 1.

The diffraction grating structure 6 for dividing the collimated light beam 5 into the plural light beams may, for example, comprise two glass plates each having a predetermined diffraction grating half 61 or 62 as shown in FIGS. 3a and 3b, which are superposed on each other to form a diffraction grating 63 as shown in FIG. 3c. Alternatively, the diffraction grating structure 6 may comprise a single or integral glass plate having two grating halves to form a diffraction grating 63 as shown in FIG. 3c.

The collimated light beam 5 passes through the diffraction grating 63 of FIG. 3c, with one half of the beam 5 through the grating half 61 and the other half of the beam 5 through the grating half 62 (i.e., with the center of the beam 5 coinciding with the boundary between the grating halves 61 and 62). Thus, the collimated light beam 5 passed through the grating half 61 is divided into the main beam 12 and two auxiliary beams 141 and 142 (although, in effect, the light beam 5 is divided into multiple beams from first-order to high-order diffracted light, only the first-order diffracted light is described here), while light beam 5 passed through the grating half 62 is divided into the main beam 12 and two auxiliary beams 151 and 152. In this case, the skew angle θt between the two straight lines 131 and 132 is determined by an angle θt between the gratings 61 and 62, and the spacing or interval between the two auxiliary beams 141 and 142 and between the two auxiliary beams 151 and 152 are determined by the interval between the grating grooves in the corresponding grating halves 61 and 62; that is, the narrower the grating groove interval, the wider becomes the auxiliary beam interval.

The main beam 12 converged and irradiated onto the recording medium 9 is zero-order diffracted light of relatively great light power and is used for the purposes of information recording and reproduction and focusing based on the conventional astigmatism technique. The two auxiliary beams 141 and 142 positioned on the imaginary straight line 131 extending at the angle θt with respect to the information recording track 11 is used for the purpose of tracking based on the conventional three-beam technique using, for example, adjacent two guide tracks 10 as the tracking basis. The astigmatism and three-beam techniques are commonly known in the art and therefore will not be described in detail herein. The other two auxiliary beams 151 and 152 positioned on the other imaginary straight line 132 extending parallel to the information recording track 11 is used for information reproduction intended for determining whether or not the recording track 11 is not blank, i.e., has any information recorded thereon, and, if so, verifying whether or not the information has been recorded correctly (i.e., the propriety of the recorded information).

In such a case where the relative movement of the optical head 1 to the recording medium 9 is in direction x of FIG. 2, the information reproduction is performed by use of the auxiliary beam 151 preceding the main beam 12, and once it is determined that the recording track 11 is blank. i.e., has no information recorded thereon, the optical head 1 is controlled in such a manner that information recording is directly effected onto the recording track 11 by use of the main beam 12. If, however, it is determined that the recording track 11 has any information recorded thereon, the optical head 1 is controlled to sequentially jump to a next adjacent information recording track in search of a blank information recording track and to then record information on the searched-for blank track. The term "relative movement" of the optical head 1 as used herein should be interpreted as referring to any of the cases where the recording medium 9 moves with the optical head 1 fixed in position, where the optical head 1 moves with the recording medium 9 fixed in position and where both of the optical head 1 and recording medium 9 move.

The auxiliary beam 152 succeeding the main beam 12 is also used in information reproduction, but this reproduction is intended for verifying the propriety of the recorded information, i.e., whether the information having been newly recorded by use of the main beam 12 is correct or not. Of course, if the direction of the relative movement of the optical head 1 to the recording medium 9 is made opposite to the direction x, the positional relationship of the auxiliary beams 151 and 152 relative to the main beam 12 is reversed, and hence the functions of the beams 151 and 152 are inverted from the above-mentioned.

Figure 4:
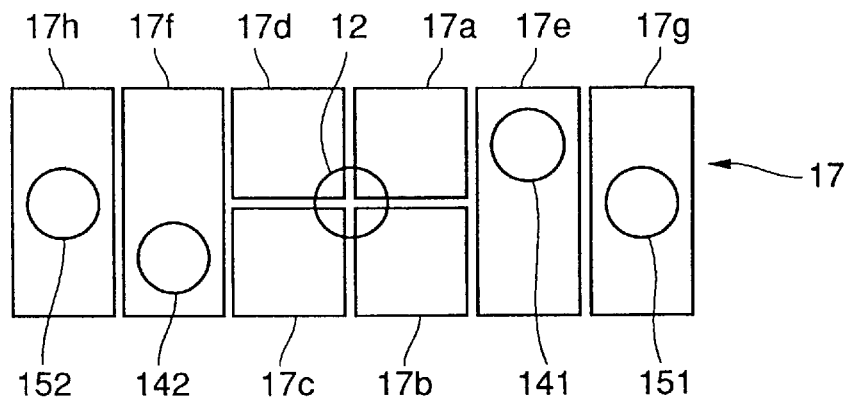
FIG. 4 is a plan view showing an example arrangement of plural elements of a light receiving unit used in the optical head of FIG. 1.

In the optical head 1 as shown in FIG. 1, the main beam 12 and four auxiliary beams 141, 142, 151 and 152 converged and irradiated onto the recording medium 9 are partially reflected from the medium 9 to backtrack to the objective lens 8, where the beams are restored into respective collimated light components. The collimated light components are then reflected through the beam splitter 7, narrowed by a light receiving lens 16, and then received by a light receiving unit 17 after having been imparted astigmatism. As shown in FIG. 4, for example, the light receiving unit 17 comprises four middle light receiving elements 17a, 17b, 17c and 17d provided in the middle of the unit 17 to receive the reflection of the main beam 12, side light receiving elements 17e and 17f to receive the reflection of the auxiliary beams 141 and 142, and side light receiving elements 17g and 17h to receive the reflection of the auxiliary beams 151 and 152.

Figure 5:
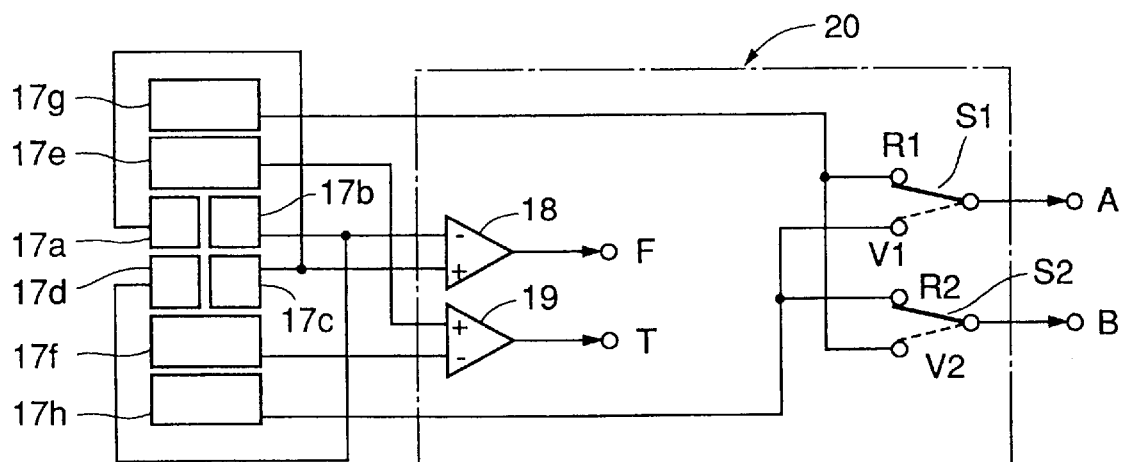
FIG. 5 is a circuit diagram of an example circuit for synthesizing or switching output signals from the light receiving elements of FIG. 4.

FIG. 5 shows an example of a circuit 20 for processing output signals from the individual light receiving elements. In the case where the astigmatism technique is employed, focusing control signal F is obtained as the output of a calculator 18 which performs an arithmetic operation of "(17a+17c)−(17b+17d)" on the output signals from the light receiving elements 17a, 17b, 17c and 17d. Where the three-beam technique is employed, tracking control signal T is obtained as the output of a calculator 19 which performs an arithmetic operation of "(17e−17f)" on the output signals from the light receiving elements 17e and 17f.

A signal for determining whether a specific track of the recording medium 9 to be used for information recording is blank or not (i.e., whether a track where information is to be recorded is a blank area or not) is obtained on the basis of the output signal from the light receiving element 17g or 17h which receives the reflection of the auxiliary beam 151 or 152. A signal for verifying whether the information recorded by use of the main beam 12 is correct or not is also obtained on the basis of the output signal from the light receiving element 17g or 17h which receives the reflection of the auxiliary beam 151 or 152. In the case where the relative movement of the optical head 1 to the recording medium 9 is in direction x of FIG. 2, the output signal from the light receiving element 17g that receives the reflection of the auxiliary beam 151 is extracted as the "signal for determining whether a specific track of the recording medium 9 to be used for information recording is blank or not", and the output signal from the light receiving element 17h that receives the reflection of the auxiliary beam 152 is extracted as the "signal for verifying whether the information recorded by use of the main beam 12 is correct or not". On the other hand, where the relative movement of the optical head 1 to the recording medium 9 is in the direction opposite to direction x, the output signal from the light receiving element 17h that receives the reflection of the auxiliary beam 152 is extracted as the "signal for determining whether a specific track of the recording medium 9 to be used for information recording is blank or not", and the output from the light receiving element 17g that receives the reflection of the auxiliary beam 151 is extracted as the "signal for verifying whether the information recorded by use of the main beam 12 is correct or not".

Accordingly, in the circuit 20 of FIG. 5, the respective connecting states of the outputs of the light receiving elements 17g and 17h are switched via switches S1 and S2 in accordance with the direction of the relative reciprocating movement to the recording medium 9, so as to obtain "signal A for determining whether a specific track of the recording medium 9 to be used for information recording is blank or not" and "signal B for verifying whether the information recorded by use of the main beam 12 is correct or not". More specifically, where the relative movement of the optical head 1 to the recording medium 9 is in direction x of FIG. 2, the switches S1 and S2 are connected with contacts R1 and R2, respectively, so that the output signal from the light receiving element 17g receiving the reflection of the auxiliary beam 151 is extracted as the "signal A for determining whether a specific track of the recording medium 9 to be used for information recording is blank or not", and the output signal from the light receiving element 17h that receives the reflection of the auxiliary beam 152 is extracted as the "signal B for verifying whether the information recorded by use of the main beam 12 is correct or not". On the other hand, where the relative movement of the optical head 1 to the recording medium 9 is in the direction opposite to direction x, the switches S1 and S2 are connected with contacts V1 and V2, respectively, so that the output signal from the light receiving element 17h is extracted as the signal A and the output signal from the light receiving element 17g is extracted as the signal B.

Whether a specific track of the recording medium 9 is blank or not can be determined on the basis of the above-mentioned signal A, and whether the information recorded by use of the main beam 12 is correct or not can be verified on the basis of the above-mentioned signal B. For example, information signals to be recorded onto the recording medium 9 may be stored in advance in memory so that the information signals are read out in synchronism with generation of the signal B for comparison and collation.

Figure 6:
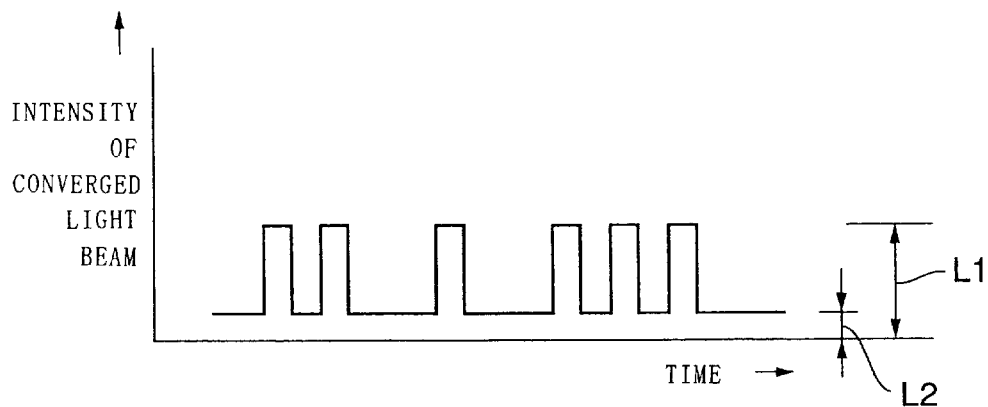
FIG. 6 is a graph explanatory of a case where the intensity of the converged light beam to be irradiated onto the recording medium is varied in accordance with information to be recorded.

If digital information is to be recorded onto the recording medium 9, the converged light beam irradiated from the optical head 1 onto the recording medium 9 is, for example, set to power intensity "L1" when an information pit is to be recorded and set to lower power intensity "L0" when no information pit is to be recorded, as shown in FIG. 6. For example, the ratio of power intensity L1 to L2 is set at about 10:1. Thus, when an information pit is to be recorded, the power intensity of the converged light beam increases so that the intensity of the reflection from the recording medium 9 also increases, and consequently, there occurs an increase in the level of the determining and verifying signals A and B obtained by the circuit of FIG. 5. In this way, the level of the determining and verifying signals A and B undesirably fluctuate due to presence and absence of information pit to be recorded. If nothing particular is done to deal with the level fluctuation of the signals A and B, it will not be possible to accurately conduct the determination as to whether a specific track of the recording medium 9 to be used for information recording is blank or not, and the verification as to whether the recorded information is correct or not. Only a small amount of fluctuation occurs in the output signals of the calculators 18 and 19 which are the focusing and tracking control signals, since they are both differential outputs.

Figure 7:
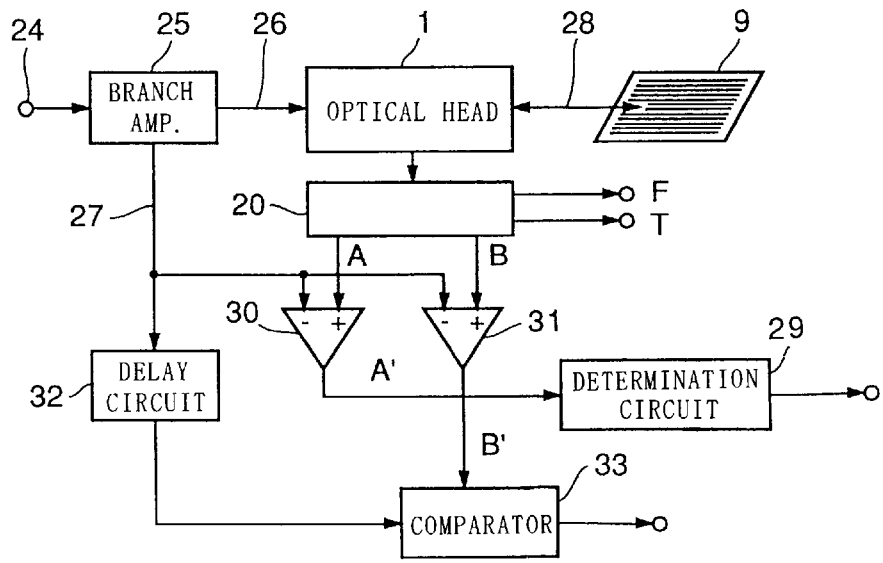
FIG. 7 is a block diagram illustrating an example structure of an improved circuit which, even where the output signal levels of the light receiving elements fluctuate with variations in the light beam intensity according to the information to be recorded.
Figure 8:
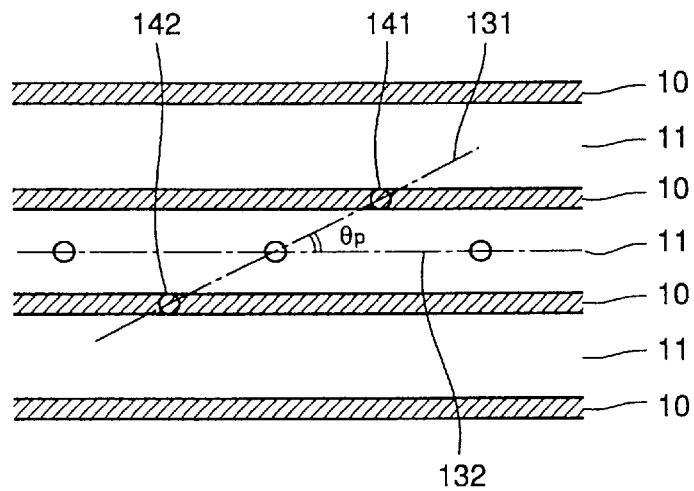
FIG. 8 is a plan view showing, in connection with a case where the push-pull technique is employed for tracking, an example arrangement of plural converged light beams irradiated from the optical head of FIG. 1 onto the recording medium.

FIG. 7 is a block diagram illustrating the structure of an improved circuit which, even when the output signal levels of the light receiving elements 17g and 17h fluctuate due to presence and absence of information pit in the information signals to be recorded, is capable of cancelling the output signal level fluctuation to thereby accurately performing the determination as to whether a specific section of the recording medium 9 to be used for recording is blank or not and the verification as to whether the recorded information is correct or not.

In the circuit of FIG. 7, each information signal to be recorded is applied to an input terminal 24 and fed to a branch amplifier 25, which generate output signals at outputs 26 and 27. The signal levels at the outputs 26 and 27 rise when an information pit is to be recorded, but fall when no information pit is to be recorded. The output 26 from the branch amplifier 25 is coupled to the optical head 1 to modulate the semiconductor laser 2 (FIG. 1). The convergent light beam 28 from the optical head 1 is irradiated onto the recording medium 9, so that the information to be recorded is recorded in the form of information pits by the varying power intensity of the beam. At the same time, part of the irradiated light is reflected from the recording medium 9 to be received by the light receiving unit 17. The output signals from the light receiving unit 17 are then input to the circuit 20 of FIG. 5, which in turn outputs the signals F, T, A and B as previously mentioned.

The signal A is applied to the plus (+) input of a differential amplifier 30, while the signal B is applied to the plus (+) input of a differential amplifier 31. The other output from the branch amplifier 25 is applied to the respective minus (−) inputs of the differential amplifiers 30 and 31. Accordingly, in the differential amplifiers 30 and 31, the level of the output 27 is subtracted from the respective levels of the signals A and B. Thus, the level of the output signal 27 from the branch amplifier 25 varies in accordance with presence and absence of pit information in the information signals to be recorded, so that the minus input signal levels of the differential amplifiers 30 and 31 vary in accordance with presence and absence of pit information in the information signals to be recorded. In this manner, the levels of the determining and verifying signals A and B are each differentially amplified by the information signals to be recorded, so that the level fluctuation is cancelled by the information signal to be recorded. As the result, the differential amplifier 30 can provide signal A' which allows an accurate determination as to whether an information recording track being currently accessed by the optical head 1 is blank or not. Also, the differential amplifier 31 can provide reproduction signal B' which is an accurate reproduction of the information having been just written into an information recording track being currently accessed by the optical head 1.

The output signal A' from the differential amplifier 30 is fed to a determination circuit 29, which performs a predetermined determination process on the basis of the signal A'. For example, if the level of the signal A' corresponds to a predetermined non-blank level, the determination circuit 29 determines that the recording track is not blank; otherwise, the determination circuit 29 determines that the recording track is blank. Necessary processing may be performed depending on the determination output signal from the determination signal 29. For example, if the determination circuit 29 determines that the recording track is blank, the information recording onto the track is continued, but if the determination circuit 29 determines that the recording track is not blank, the optical head 1 is caused to access another information recording track, and so on.

In the example of FIG. 7, the output signal 27 from the branch amplifier 25 is given to a delay circuit 32 which stores the original signal of information to be recorded and delayedly outputs the same in synchronism with the timing of the reproduction signal B'. This output (original signal of information to be recorded) from the delay circuit 32 and the reproduction signal B' output from the differential amplifier 31 are fed to a comparator 33, where a comparison and collation are made to determine whether the two signals are coincident with each other. From the resultant output signal from the comparator 33, it is possible to promptly verify whether the information having just been recorded on the recording medium 9 is correct or not. That is, where the output signal from the comparator 33 indicates "non-coincident", it is determined that there has been a recording error, and any suitable processes may be performed such as display of the error and re-recording of the information.

While the description has been made in connection with a case where the astigmatism technique is employed for focusing, any other suitable technique may be applied for that purpose, such as the known "knife edge", "critical angle", or "edge mirror" technique (see, for example, Japanese Patent Laid-open Publication No. HEI 3-142720).

Figure 9:
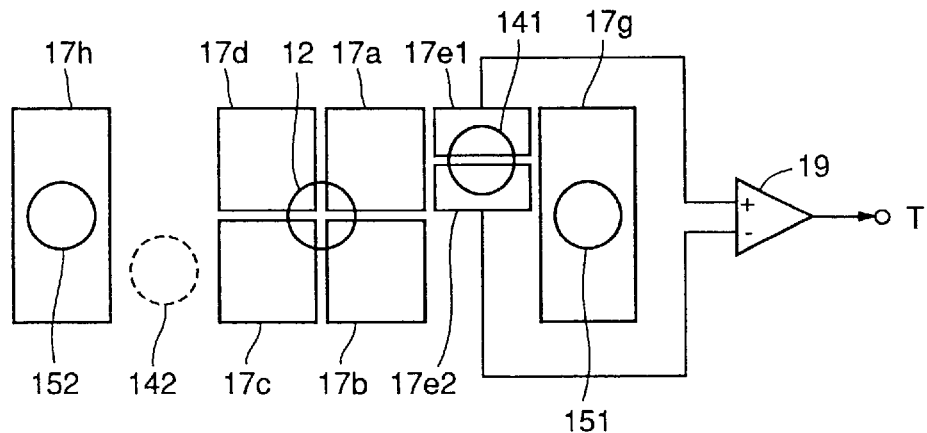
FIG. 9 is a plan view showing an example arrangement of the light receiving elements in the case where the push-pull technique is employed for tracking.

Further, while the description has been made in connection with a case where the three-beam technique is employed for tracking, the well-known push-pull technique may be applied for that purpose. In the case where the push-pull technique is applied, it is only sufficient that the skew angle between the two straight lines 131 and 132 be set at θp rather than θt in such a manner that the auxiliary beams 141 and 142 are irradiated onto the center of the respective guide tracks 10 and the reflection of either of the beams 141 and 142 is received by either of the light receiving elements 17e and 17f, and also that the light receiving element 17e or 17f be divided into two element halves so as to extract a differential output between the respective outputs from the element halves. For example, where the reflection of the auxiliary beam 141 is received by the light receiving element 17e, the element 17e may be divided into two element halves 17e1 and 17e2 as shown in FIG. 9 in such a manner that the respective outputs from the element halves 17e1 and 17e2 are supplied to the differential amplifier 19. The differential amplifier 19, in turn, performs a differential operation of "17e1–17e2" to output the tracking control signal T. In this case, the other light receiving element 17f is not used. If, on the other hand, the reflection of the auxiliary beam 142 is received by the light receiving element 17f, the element 17f may be divided into two element halves to ultimately obtain the tracking control signal T. In this case, the other light receiving element 17e is not used.

The diffraction grating structure 6 for the optical head may be other than the one comprising two glass plates 61 and 62 each having a grating half as shown in FIGS. 3a and 3b; for example, there may be employed two superposed conventional diffraction gratings each having grating grooves all over the surface thereof.

Furthermore, although the above-described embodiment, in order to form plural auxiliary beams distributed on two straight lines traversing a single main beam, employs a single light source and a diffraction grating structure comprising two gratings which have different grating groove intervals and are positioned at a predetermined angle with respect to each other, these components may be replaced with a multibeam laser provided with a plurality of light sources. The recording medium 9 for use in the present invention may of course be other than the optical card as mentioned, such as a disk-type or any other type recording medium. It should also be understood that the recording medium 9 may be the rewritable-type rather than the write-once type.

As has so far been described, the present invention is characterized in that, when the recording light beam accesses a track for recording, a reproducing light beam is irradiated onto the same track before the recording light beam so that whether or not the track to be used for recording is a blank area is determined on the basis of a reproduction signal resulting from the reproducing light beam irradiation. With this feature, it is allowed to promptly determine whether a track to be used for recording is a blank area with no need to read out track information registered in a directory area.

The present invention is also characterized in that whether or not information has been properly recorded on the track is verified on the basis of the reproduction signal resulting from the reproducing light beam irradiation. With this feature, whether the information having just been recorded is correct or not can be immediately verified, and thus it is not necessary for the optical head to make a reciprocating (forward/backward) movement relative to the same track for recording and reproduction (verification). Namely, in a single reciprocating movement of the optical head relative to the recording medium, recording and reproduction (verification) for one track can be performed during the forward travel, and recording and reproduction (verification) for another track can be performed during the backward travel. This achieves enhanced recording efficiency and can shorten the total time necessary for recording. In addition, because the reproduction for verifying the recorded information is done in the forward direction, there is no need to provide a circuit etc. for reversing the time series of reproduced information or information to be recorded. Such features achieve simplified structure, reduced size, economized cost and increased operational speed of the device.

What is claimed is:

1. An optical information recording device comprising:

a laser light source;

a diffraction grating section that divides laser light generated by said laser light source into a main beam to be used as a recording light beam, auxiliary beam to be used as a reproducing light beam and tracking auxiliary beams, wherein the recording light beam irradiates onto a track where information is to be recorded, and wherein the reproducing light beam irradiates onto said track prior to the recording light beam; and means for determining, on the basis of a reproduction signal resulting from irradiation onto said track of the reproducing light beam, whether said track is a blank area having no information recorded thereon, and if said track is determined blank, selecting said track for recording;

wherein said diffraction grating section comprises a diffraction grating structure including two gratings that are different from each other in grating groove interval and are provided at a predetermined angle with respect to each other, and wherein the auxiliary beam to be used as said reproducing light beam is positioned with respect to the main beam on one of two imaginary straight lines crossing each other at the predetermined angle and the tracking auxiliary beam is positioned with respect to the main beam on the other of the two imaginary straight lines.

2. An optical information recording device as defined in claim 1 wherein said auxiliary beam further comprises two reproducing light beams positioned on both sides of said recording light beam along a direction where said track extends, wherein use of the reproducing light beams is switched depending on a travelling direction of said beams relative to said track.

3. An optical information recording device as defined in claim 1 wherein said tracking auxiliary beam further comprises two tracking auxiliary beams positioned on said other of the two imaginary straight lines.

4. An optical information recording device as claimed in claim 1, further comprising means for modulating power intensity of the laser light generated by said laser light source in accordance with information to be recorded, and means for differentially amplifying said reproduction signal in accordance with the information to be recorded as to perform control to cancel level fluctuation of said reproduction signal.

5. An optical information recording device comprising:

a laser light source;

a diffraction grating section that divides laser light generated by said laser light source into a main beam to be used as a recording light beam, auxiliary beams to be used as first and second reproducing light beams and a tracking auxiliary beam, wherein the recording light beam is irradiated onto a track where information is to be recorded, and wherein the first reproducing light beam is irradiated onto said track before the recording light beam;

means for determining, on the basis of a reproduction signal resulting from irradiation onto said track of the first reproducing light beam, whether said track is a blank area having no information recorded thereon;

wherein the second reproducing light beam is irradiated onto said track after the recording light beam; and means for verifying, on the basis of a reproduction signal resulting from irradiation onto said track of the second reproducing light beam, propriety of information recorded on said track by use of the recording light beam;

wherein said diffraction grating section comprises a diffraction grating structure including two gratings that are different from each other in grating groove interval and are provided at a predetermined angle with respect to each other, and wherein the auxiliary beams to be used as said first and second reproducing light beams are positioned on one of two imaginary straight lines crossing each other at the predetermined angle and the tracking auxiliary beam is positioned with respect to the main beam on the other of the two imaginary straight lines.

6. An optical information recording device as claimed in claim 5, further comprising means for modulating power intensity of the laser light generated by said laser light source, in accordance with information to be recorded, and means for differentially amplifying said reproduction signal in accordance with the information to be recorded so as to perform control to cancel level fluctuation of said reproduction signal.

7. An optical information recording device comprising:

a laser light source;

a diffraction grating section that divides laser light generated by said laser light source into a main beam to be used as a recording light beam, an auxiliary beam to be used as a reproducing light beam and a tracking auxiliary beam, wherein the recording light beam is irradiated onto a track where information is to be recorded, and wherein the reproducing light beam is irradiated onto said track after the recording light beam; and means for verifying, on the basis of a reproduction signal resulting from irradiation onto said track of the reproducing light beam, propriety of information recorded on said track by use of the recording light beam;

wherein said diffraction grating section comprises a diffraction grating structure including two gratings that are different from each other in grating groove interval and are provided at a predetermined angle with respect to each other, and wherein the auxiliary beam to be used as said reproducing light beam is positioned with respect to the main beam on one of two imaginary straight lines crossing each other at the predetermined angle and the tracking auxiliary beam is positioned with respect to the main beam on the other of the two imaginary straight lines.

8. An optical information recording device as defined in claim 7 wherein said auxiliary beam further comprises two reproducing light beams positioned on both sides of said recording light beam along a direction where said track extends, wherein use of the reproducing light beams is switched depending on a travelling direction of said beams relative to said track.

9. An optical information recording device as defined in claim 7 wherein said tracking auxiliary beam further comprises two tracking auxiliary beams positioned on said other of the two imaginary straight lines.

10. An optical information recording device as claimed in claim 7, further comprising means for modulating power intensity of the laser light generated by said laser light source, in accordance with information to be recorded, and means for differentially amplifying said reproduction signal in accordance with the information to be recorded so as to perform control to cancel level fluctuation of said reproduction signal.

* * * * *